Oct. 13, 1931.  H. KOHIROGAWA  1,826,939
MECHANICAL DISPLAY DEVICE
Filed Jan. 3, 1930  4 Sheets-Sheet 1
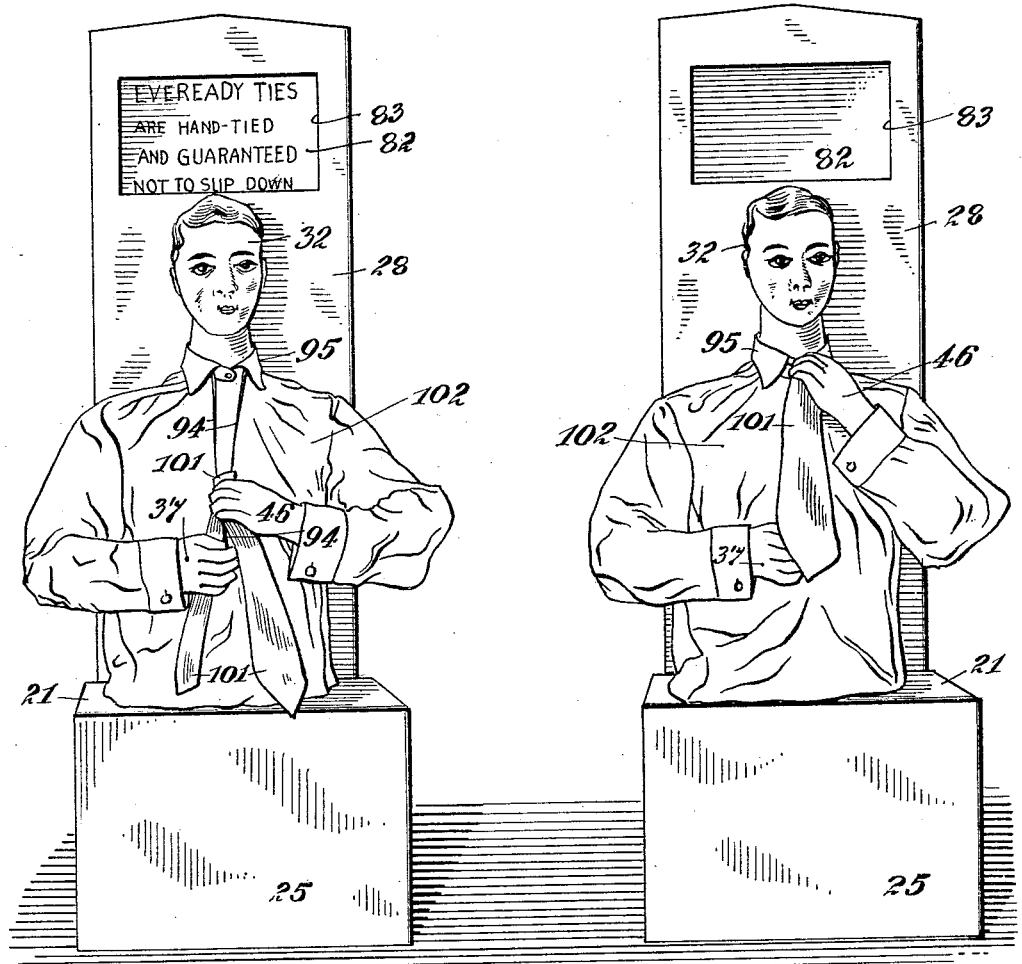
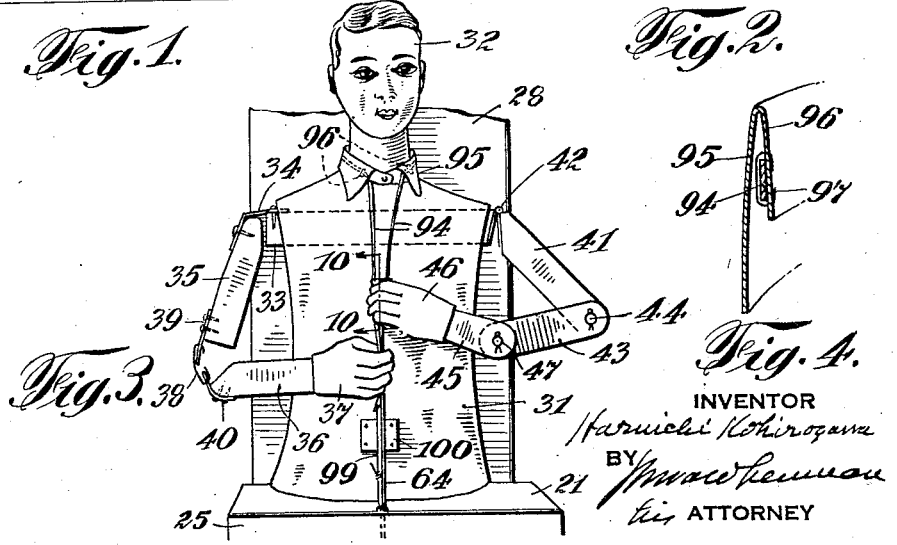

Oct. 13, 1931.   H. KOHIROGAWA   1,826,939
MECHANICAL DISPLAY DEVICE
Filed Jan. 3, 1930   4 Sheets-Sheet 2

INVENTOR
Haruichi Kohirogawa
BY
ATTORNEY

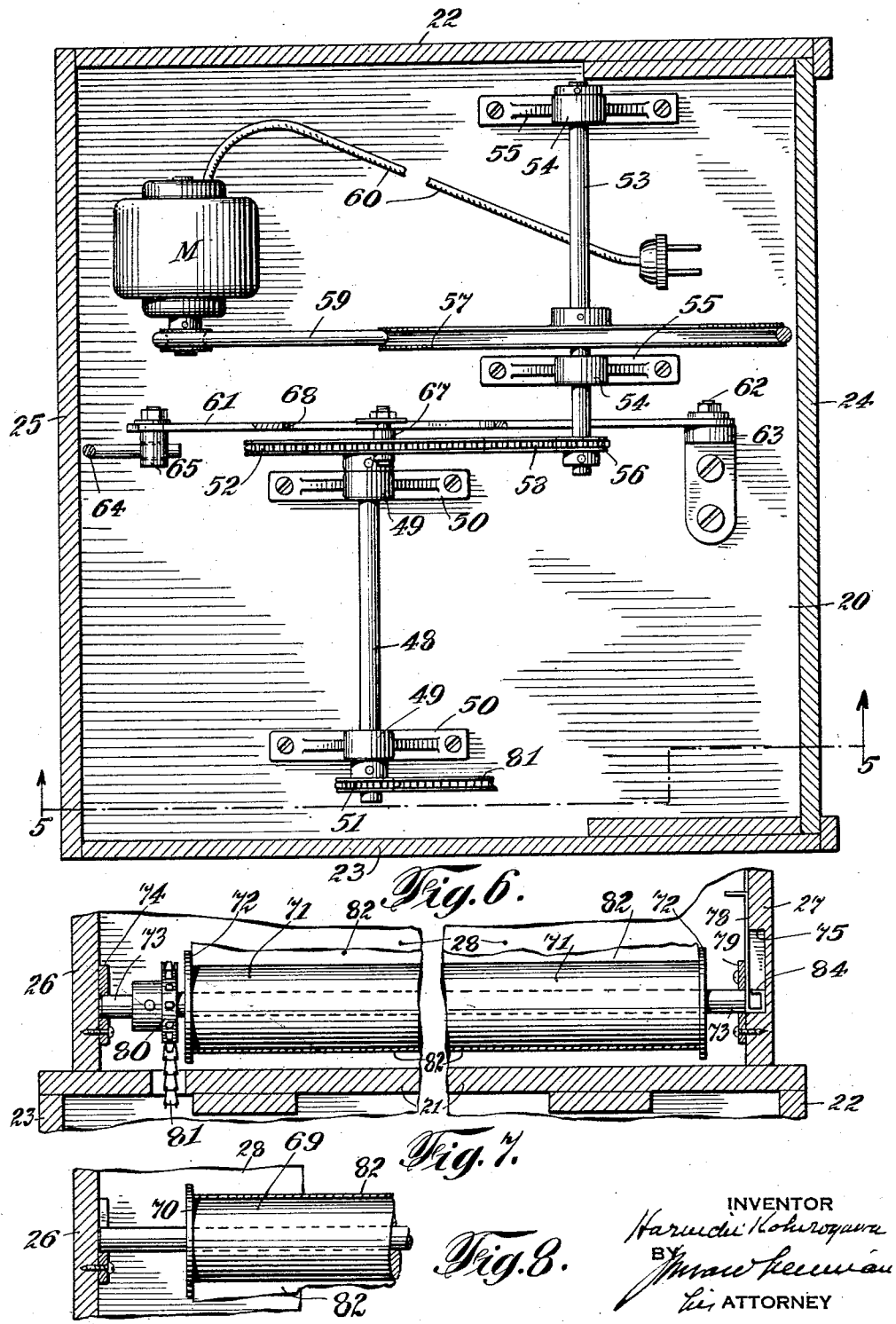

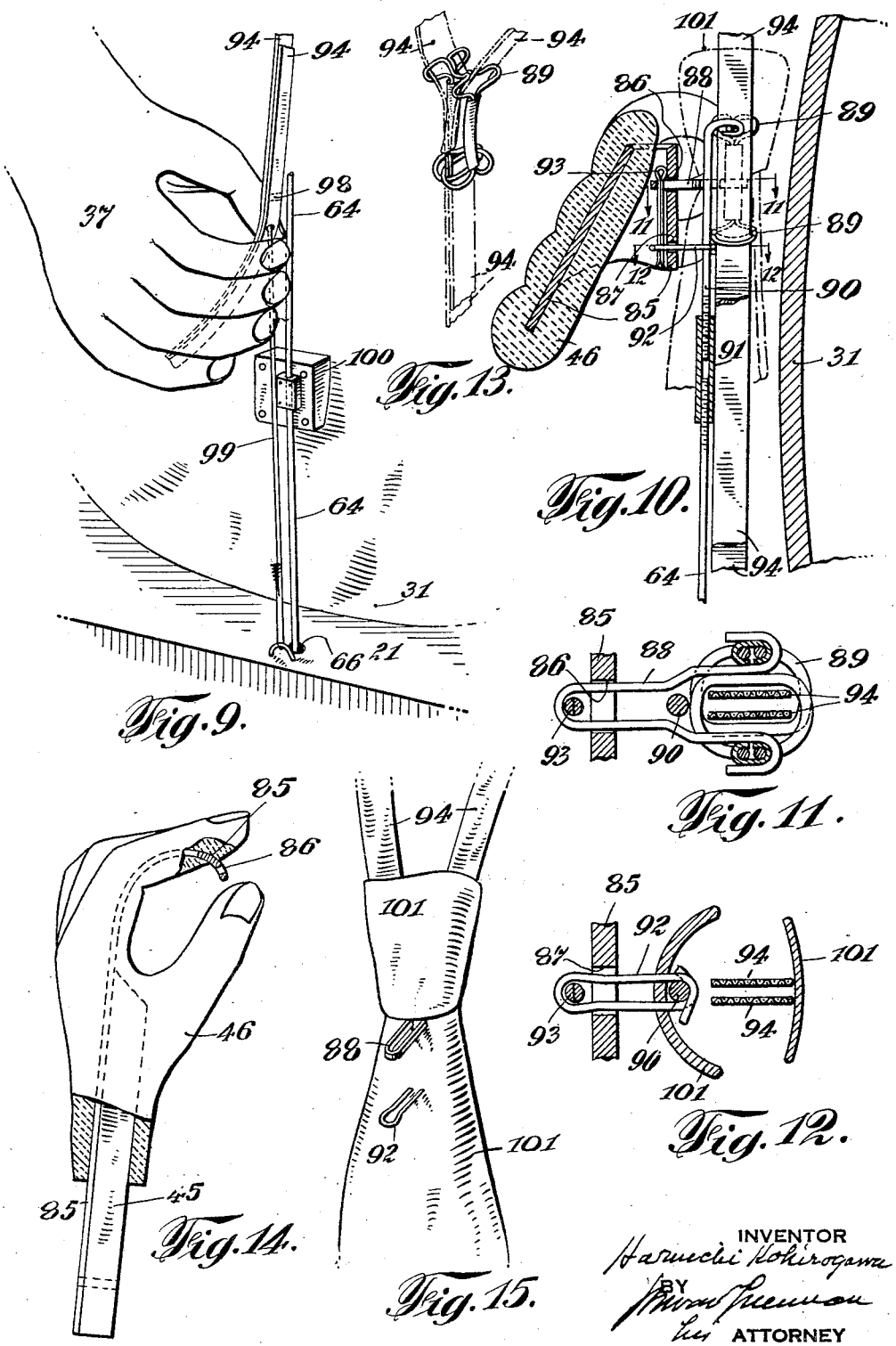

Patented Oct. 13, 1931

1,826,939

UNITED STATES PATENT OFFICE

HARUICHI KOHIROGAWA, OF NEW YORK, N. Y.

MECHANICAL DISPLAY DEVICE

Application filed January 3, 1930. Serial No. 418,274.

My invention relates to display devices and refers particularly to devices adapted to illustrate the tieing, or arranging, of neckties.

The device of my invention is intended to demonstrate and illustrate the ease, repidity and certainty with which a necktie formed upon a certain necktie holder of my invention can be properly arranged and positioned.

The necktie holder illustrated in the accompanying drawings is protected by United States Letters Patents and hence is not the subject matter of this application, which is directed solely to such mechanism and arrangement of parts as will similate the actions of one employing said necktie holder.

The objects of my invention and the means I employ for accomplishing them will be evident upon a consideration of my specification and its accompanying drawings.

In the accompanying drawings illustrating one form of the device of my invention similar parts are designated by similar numerals.

Figure 1 is a front view of one form of my device showing a necktie in untied position.

Figure 2 is a front view of Figure 1 with the tie in tied position.

Figure 3 is a view of Figure 1 with the shirt and necktie removed to show the operating mechanism.

Figure 4 is a perspective view showing means for attaching the tape to the collar.

Figure 6 is a section through the line 6—6 of Figure 5.

Figure 7 is a section through the line 7—7 of Figure 5.

Figure 8 is a section through the line 8—8 of Figure 5.

Figure 9 is a perspective view of the right hand of the shown device with its accompanying parts.

Figure 10 is a section through the line 10—10 of Figure 3.

Figure 11 is section through the line 11—11 of Figure 10.

Figure 12 is a section through the line 12—12 of Figure 10.

Figure 13 is a perspective view of the necktie holder.

Figure 14 is a side view of the left hand of the device partly broken away for clearness of description.

Figure 15 is a view of the necktie form and tape.

Figure 5:
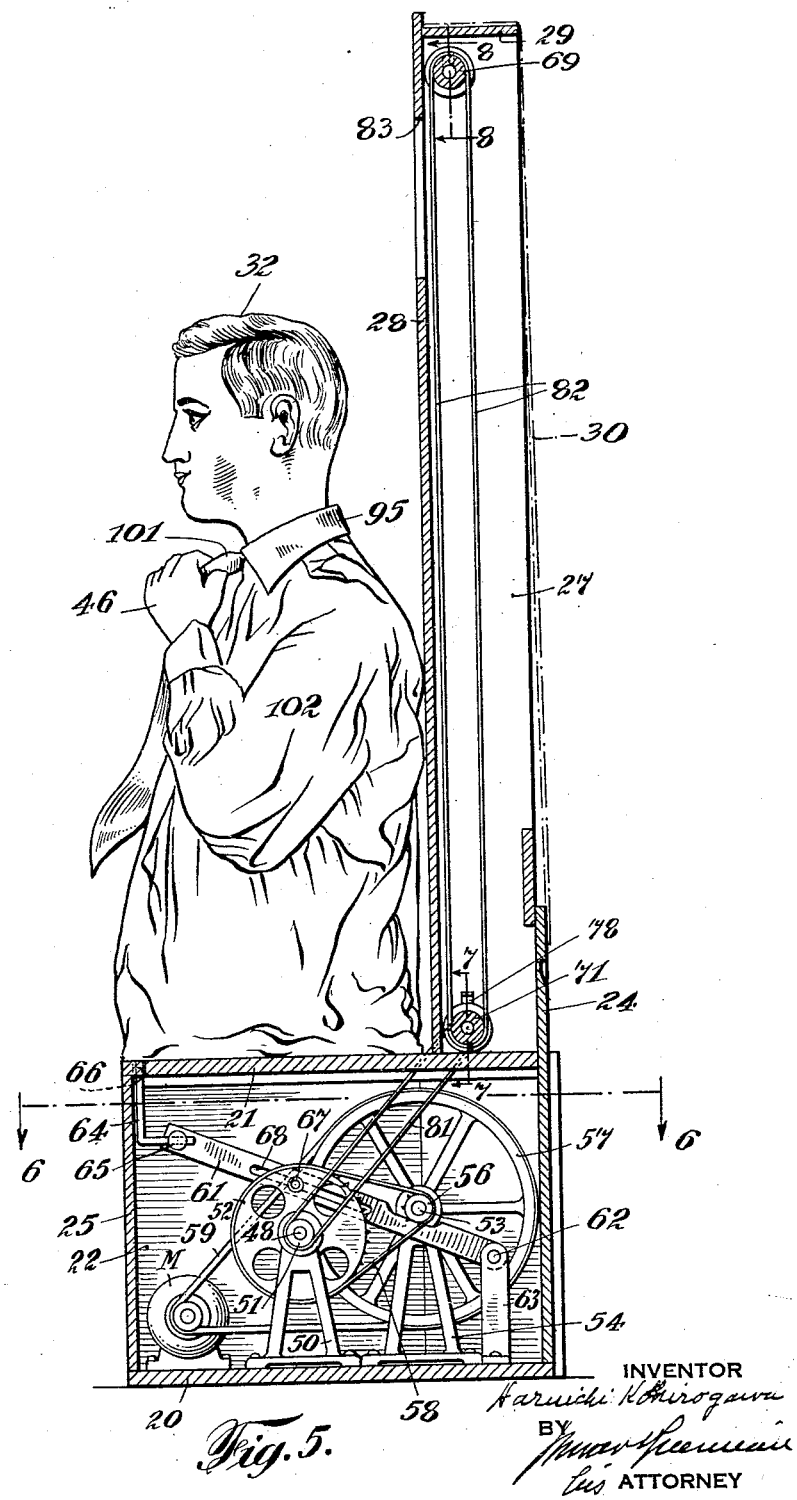
Figure 5 is a section through the line 5—5 of Figure 6.

The particular form of the device of my invention shown in the accompanying drawings comprises a base chamber having the bottom 20 the top, 21, the sides 22, 23, the back 24 and the front 25, the back 24 being slidable in order to obtain access to the mechanism within the base chamber.

Positioned above the rear portion of the base chamber is a display cabinet having the sides 26, 27, the front 28, the top 29 and the cloth back 30.

Positioned upon the base chamber and in front of the display cabinet is a clothed bust, the skeleton of which consists of the body 31, carrying the head 32. Fixedly attached to the body 31 is a cross-piece 33. Fixedly attached to one extremity of the cross-piece 33 is an angle-iron 34, to which is loosely jointed the arm element 35. The arm element 36 carrying the hand 37 is connected to the element 35 by means of the hook 38 connecting the metal plates 39 and 40 fixedly attached to the elements 35 and 36 respectively.

The arm element 41 is hingedly attached at 42 to the cross-bar 33, the arm element 43 is pivotally connected at 44 to the element 41 and the arm element 45 carrying the hand 46 is pivotally attached at 47 to the element 43.

The operating mechanism within the base chamber comprises a revoluble shaft 48 revoluble within bushings 49, 49 of the supporting brackets 50, 50. The shaft 48 carries the toothed wheel 51, described later, and the toothed wheel 52.

A shaft 53 is revoluble within bushings 54, 54 of the supports 55, 55 and carries the toothed wheel 56 and the pulley 57. A chain belt 58 connects the toothed wheels 52 and 56, and a belt 59 connects the pulley 57 with the motor M, which is connected by the wire connection 60 with a convenient electric circuit.

A flat bar 61 is pivotally connected at 62 with the fixed bracket 63, the other extremity of the bar 61 carrying the vertical rod 64 pivotally attached thereto at 65, the rod 64 passing through an opening 66 of the top member 21. A pin 67 carried by the wheel 52 is movable within the elongated slot 68 of the bar 61.

Positioned within the display cabinet is a revoluble roller 69 supported in an open recess of a bracket 70 attached to each side 26 and 27, the roller 69 having a flange 70 at each end portion thereof.

Positioned within the display cabinet is a revoluble roller 71 having a flange 72 at each end thereof. One end of the shaft 73 passing through the roller 71 rests within an open recess of the supporting block 74. The other end of the shaft 73 is positioned within an opening in the supporting block 79 which is attached to the side 27. A fastening plate 78 has the extended bent portion 84 within the recess 75 of the side 27, the portion 84 abutting upon the end of the shaft 73 and the wall of the recess 75. To remove the shaft 73, the fastening plate 78 is moved upwardly, allowing the shaft end to be moved into the recess 75, thus removing the other end of the shaft 73 from the block 74.

The shaft 73 carries a toothed wheel 80 which is connected to the toothed wheel 51 by the chain belt 81.

A strip of flexible material 82, such as paper or fabric passes over the roller 69 and 71 and carries a plurality of advertisements, or printed matters, upon its outer face and visible through the opening 83 of the front member 28.

Within the hand 46 and attached to the member 45 is a hooked shaped member 85 having holes 86 and 87 therein. A hooked member 88 passes through the hole 86 and is attached to the necktie holder 89. The rod 64 is connected to the rod 90 by means of the turn-buckle 91, and the rod 90 is connected to the necktie holder 90. A clamping member 92 passes through the hole 87 of the member 85 and is bent around the rod 90. A cotter-pin 93 passes through the loops of the members 88 and 92.

A tape 94 passes around and beneath the collar 95 of the figure and is attached to the inner fold 96 of the collar by means of wire clamps 97, 97. The tape 94 passes through the necktie holder 89 and the two extremities are attached to each other at 98 within the hand 37. A tension tape, or string, 99 is attached to the tape 94 and the top 21, passing over the block 100 which is attached to the body 31. A necktie loop, or form, 101 is made over the necktie holder 89 with the loops 88 and 92 passing therethrough.

The operation of the device is as follows: The motor M actuates the train of mechanism enclosed in the base chamber giving the rod 64 a vertical reciprocal movement which carries the hand 46 upwardly and downwardly moving the necktie form 101 into the positions shown in Figures 1 and 2, the moving parts being covered by the shirt 102, and the hand 37 remaining stationary.

At the same time the train of mechanism revolves the rollers 69 and 71, moving the strip of material 82, thus showing a plurality of printed matter through the window 83 of the front member 28.

It will thus be seen that my device presents the representation of a man arranging his necktie by means of a vertical movement of the tie-form along a tape representing the remainder of the tie.

I do not limit myself to the particular size, shape, number or arrangement of parts as shown and described as these are given simply as a means for clearly describing the device of my invention.

What I claim is:

1. In a mechanical display device, in combination, a representation of the upper portion of a human figure having one stationary arm with an extended hand extremity and a movable arm having an extended hand extremity and means capable of moving the hand extremity of said movable arm in a vertical line between the hand extremity of said stationary arm and the upper part of the device.

2. In a mechanical display device, in combination, a representation of the upper portion of a human figure having one stationary arm and one movable arm, a tape extending from the upper portion of said representation to said stationary arm, a necktie holder slidably movable over said tape and fixedly attached to said movable arm and means adapted to move the hand portion of said movable arm vertically along said tape.

3. In a mechanical display device, in combination, a representation of the upper portion of a human figure; an arm having a hand extremity positioned stationary to said figure representation; an arm having a hand extremity, said arm being vertically movable with respect to said figure representation; a fixed tape extending from the upper portion of said figure to said stationary hand, a necktie holder slidably movable over said tape and fixedly attached to said movable hand and means adapted to give a vertically reciprocal movement to said movable hand.

4. In a mechanical display device, in combination, a representation of the upper portion of a human figure; an arm having a hand extremity positioned stationary with respect to said figure representation; a second arm comprising an upper arm element pivotally attached to said figure representation, a forearm element pivotally attached to said upper arm element and a hand element pivotally attached to said forearm element; a tape extending from the upper part of said figure element to said stationary hand, a necktie holder slidably movable over said tape and fixedly attached to said movable hand, and means for moving said movable hand element along said tape.

5. In a mechanical display device, in combination, a representation of the upper portion of a human figure; an arm having a hand extremity positioned stationary with respect to said figure representation; a second arm comprising an upper arm element pivotally attached to said figure representation, a forearm element pivotally attached to said upper arm element and a hand element pivotally attached to said forearm element; a tape extending from the upper part of said figure element to said stationary hand, a necktie holder movable along said tape and attached to said movable hand and means adapted to give a reciprocating movement to said movable hand.

6. In a mechanical display device, in combination, a representation of the upper portion of a human figure; an arm having a hand extremity positioned stationary with respect to said figure representation; a second arm comprising an upper arm element pivotally attached to said figure representation, a forearm element pivotally attached to said upper arm element and a hand element pivotally attached to said forearm element; a tape extending around the upper portion of said figure representation, the ends of which are maintained in stationary position by said stationary hand; a necktie holder movable along said tape and attached to said movable hand and means adapted to give a reciprocating movement to said movable hand.

7. In a mechanical display device, in combination, a representation of the upper portion of a human figure, having one stationary arm and one movable arm, means capable of moving the hand extremity of said movable arm vertically between the hand extremity of said stationary arm and the upper part of the device, a casing having an opening therein, a revoluble strip of flexible material within said casing, a portion of which is visible through said opening and means for revolving said strip exposing different portions of said strip to said opening and means coacting with said arm movement adapted to give an intermittent movement to said strip.

8. In a mechanical display device, in combination, a representation of the upper portion of a human figure having one stationary arm and one movable arm, a tape extending from the upper portion of said representation to said stationary arm, means adapted to move the hand portion of said movable arm vertically along said tape, a casing having an opening therein, a revoluble strip of flexible material within said casing, a portion of which is visible through said opening and means for revolving said strip exposing different portions of said strip to said opening and means coacting with said arm movement adapted to give an intermittent movement to said strip.

9. In a mechanical display device, in combination, a representation of the upper portion of a human figure; an arm having a hand extremity positioned stationary to said figure representation; an arm having a hand extremity, said arm being vertically movable with respect to said figure representation; a fixed tape extending from the upper portion of said figure to said stationary hand, a necktie holder slidably movable over said tape and fixedly attached to said movable hand, means adapted to give a vertically reciprocal movement to said movable hand, a casing having an opening therein, a revoluble strip of flexible material within said casing, a portion of which is visible through said opening and means for revolving said strip exposing different portions of said strip to said opening and means coacting with said arm movement adapted to give an intermittent movement to said strip.

10. In a mechanical display device, in combination, a representation of the upper portion of a human figure; an arm having a hand extremity positioned stationary with respect to said figure representation; a second arm comprising an upper arm element pivotally attached to said figure representation, a forearm element pivotally attached to said upper arm element and a hand element pivotally attached to said forearm element; a tape extending from the upper part of said figure element to said stationary hand, means for moving said movable hand element along said tape, a casing having an opening therein, a revoluble strip of flexible material within said casing, a portion of which is visible through said opening and means for revolving said strip exposing different portions of said strip to said opening and means coacting with said arm movement adapted to give an intermittent movement to said strip.

11. In a mechanical display device, in combination, a representation of the upper portion of a human figure; an arm having a hand extremity positioned stationary with respect to said figure representation; a second arm comprising an upper arm element pivotally attached to said figure representation, a forearm element pivotally attached to said upper arm element and a hand element pivotally attached to said forearm element; a tape extending from the upper part of said figure element to said stationary hand, a necktie holder movable along said tape and attached to said moveable hand, means adapted to give a reciprocating movement of said moveable hand, a casing having an opening therein, a revoluble strip of flexible material within said casing, a portion of which is visible through said opening and means for revolving said strip exposing different portions of said strip to said opening and means coacting with said arm movement adapted to give an intermittent movement to said strip.

12. In a mechanical display device, in combination, a representation of the upper portion of a human figure; an arm having a hand extremity positioned stationary with respect to said figure representation; a second arm comprising an upper arm element pivotally attached to said figure representation, a forearm element pivotally attached to said upper arm element and a hand element pivotally attached to said forearm element; a tape extending around the upper portion of said figure representation, the ends of which are maintained in stationary position by said stationary hand; a necktie holder movable along said tape and attached to said movable hand, means adapted to give a reciprocating movement to said movable hand, a casing having an opening therein, a revoluble strip of flexible material within said casing, a portion of which is visible through said opening and means for revolving said strip exposing different portions of said strip to said opening and means coacting with said arm movement adapted to give an intermittent movement to said strip.

Signed at New York city in the county of New York and State of New York this 31st day of December, 1929.

HARUICHI KOHIROGAWA.